INVENTORS
DON M. MULLER
LA VAR E. WHITTLE
VICTOR J. CHARTRAND
BY Lyon & Lyon
ATTORNEYS

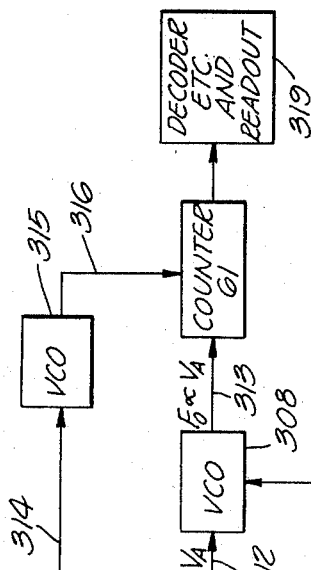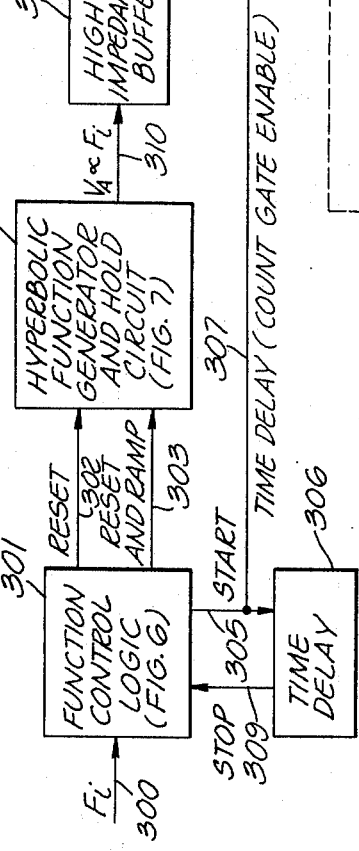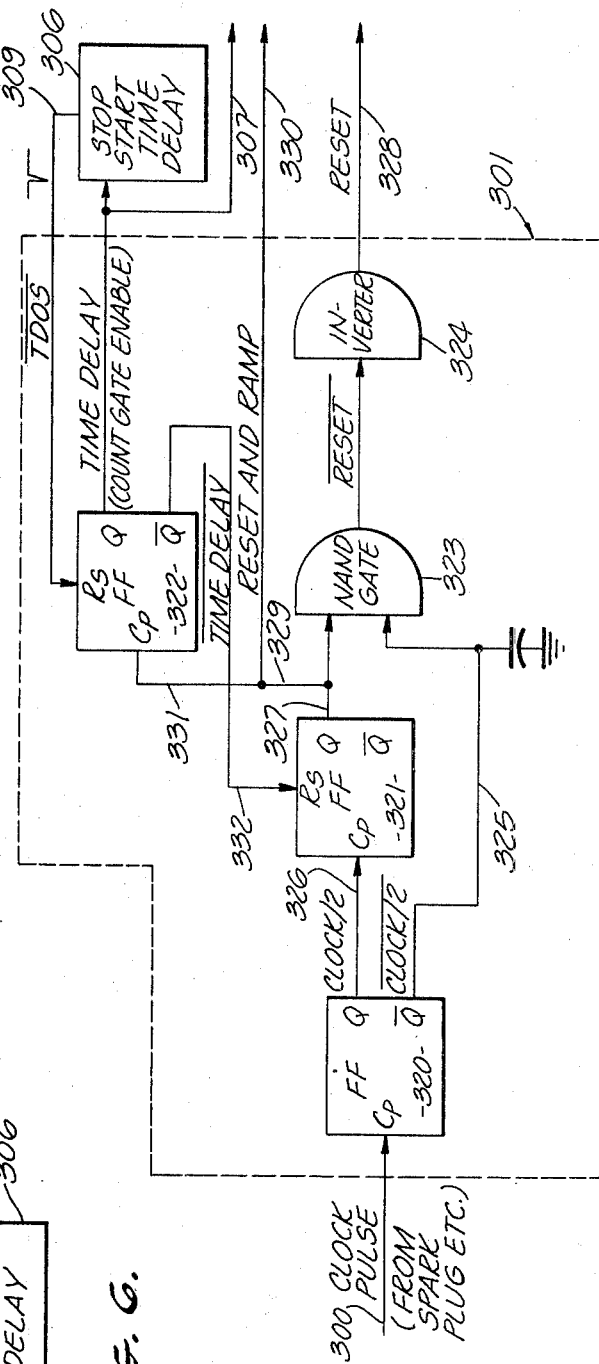

Dec. 23, 1969  D. M. MULLER ET AL  3,485,093
ENGINE PERFORMANCE ANALYZER
Filed Dec. 1, 1967  6 Sheets-Sheet 5
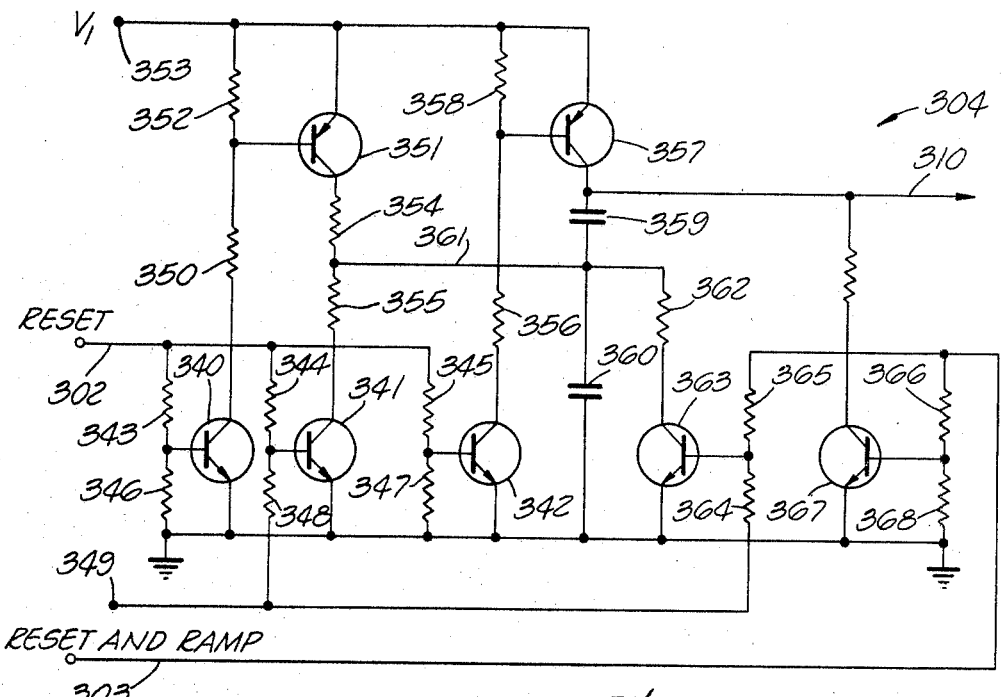
*Fig. 7.*
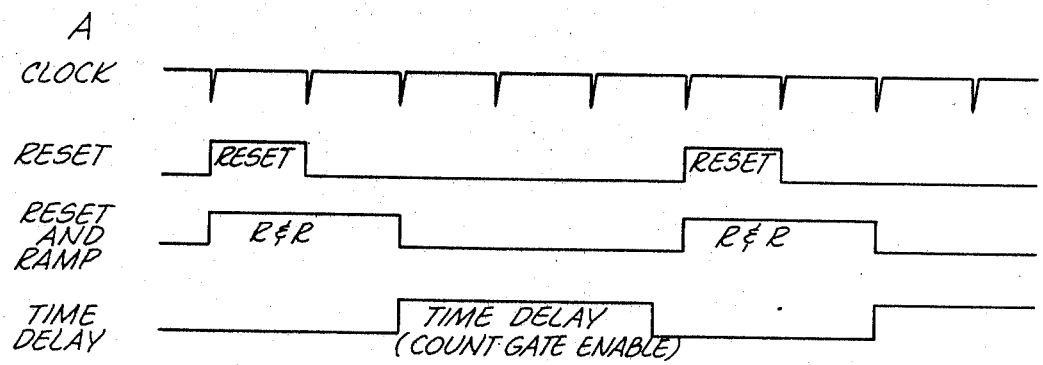
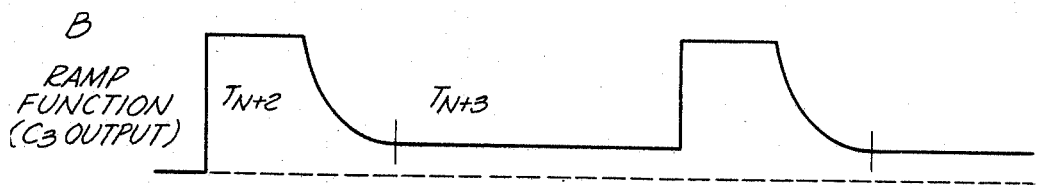
*Fig. 8.*
INVENTORS.
DON M. MULLER
LA VAR E. WHITTLE
BY VICTOR J. CHARTRAND
Lyon & Lyon
ATTORNEYS

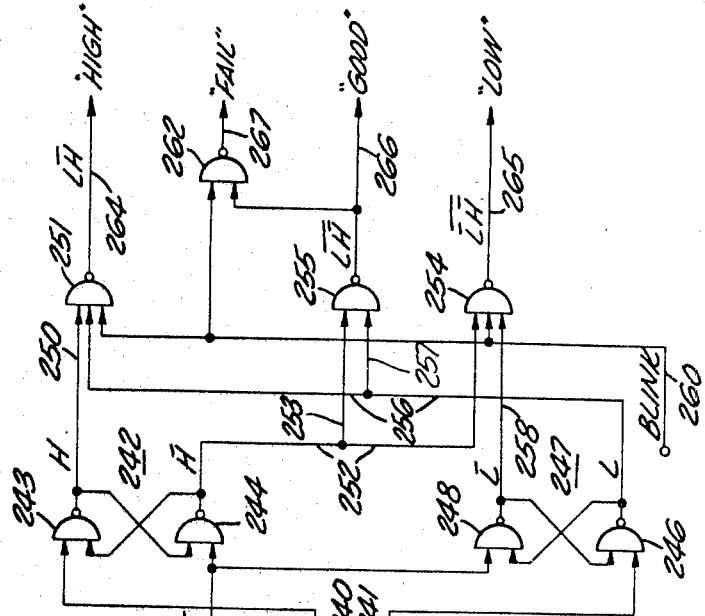
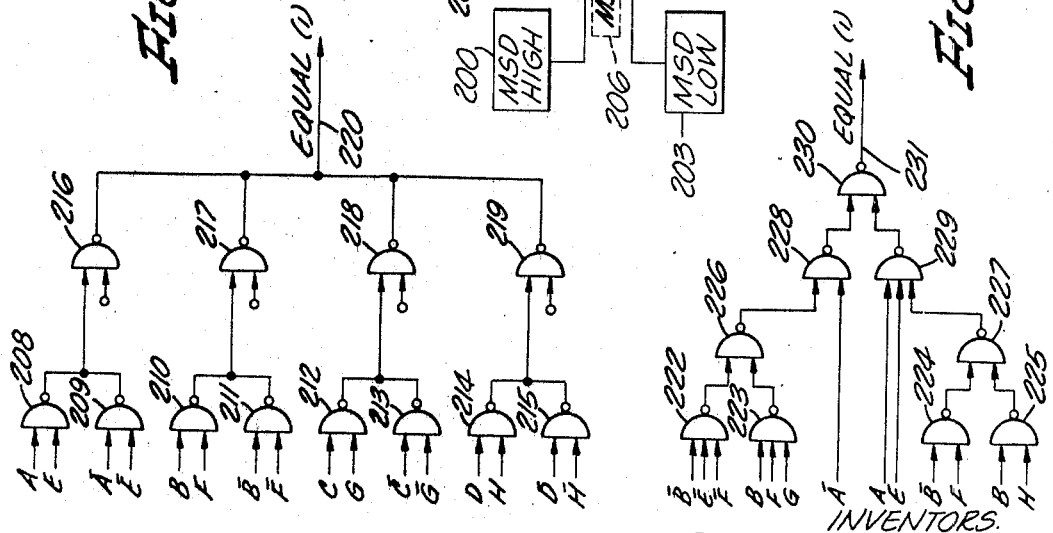
FIG. 10a.
FIG. 10b.
FIG. 10c.
INVENTORS.
DON M. MULLER
LA VAR E. WHITTLE
VICTOR J. CHARTRAND
BY
ATTORNEYS

United States Patent Office 3,485,093
Patented Dec. 23, 1969

3,485,093
ENGINE PERFORMANCE ANALYZER
Don M. Muller and LaVar E. Whittle, Granada Hills, and Victor Chartrand, Northridge, Calif., assignors to Universal Testproducts, Inc., Chatsworth, Calif., a corporation of California
Continuation-in-part of application Ser. No. 487,861, Sept. 16, 1965. This application Dec. 1, 1967, Ser. No. 687,390
Int. Cl. G01n 15/00; G06f 15/00
U.S. Cl. 73—116                            11 Claims

ABSTRACT OF THE DISCLOSURE

Apparatus for the analysis of internal combustion engines, or similar systems, providing systems coupled to transducers attached to the engine adapted to receive performance data and to compare such data with programmed data, and further including means for conditioning performance data, means for controlling the engine to obtain a desired performance, means for accumulating performance data for comparison and means providing a readout of the analysis results.

---

The present invention relates to performance analysis and more particularly to methods and apparatus for analyzing the performance of equipment, such as internal combustion engines. This is a continuation-in-part of the application filed Sept. 16, 1965, Ser. No. 487,861, now abandoned, by Don M. Muller and LaVar E. Whittle.

Heretofore, various equipment and systems have been devised for measuring, displaying, recording, etc., numerous parameters of a unit under test. In the automotive field, for example, electronic test equipment for use in engine analysis is available and essentially consists of an oscilloscope and various meters for providing a visual indication, through waveforms, displayed on the oscilloscope and meter deflections, representative of certain parameters of the engine under test. Typically, the oscilloscope is employed to enable examination of the waveforms produced at certain specific points in the engine, and from certain characteristic shapes of these waveforms the operator performing the test attempts to determine the nature of engine difficulties. This type of evaluation requires considerable skill and training of the operator, and the accuracy of the evaluation essentially is entirely dependent thereupon. Thus, one requesting the test, such as an automobile owner, has no means for checking the judgment of the operator. In addition, the reading of the meters frequently is difficult since the values indicated thereby fluctuate quite rapidly. After obtaining certain readings, the operator then generally must consult standard data to determine what proper values should exist, exercise his judgment to determine if the indicated values are reasonable under the circumstances, and then isolate the fault or faults. It will be appreciated that this type of testing is time consuming and costly, and the results of the test are not necessarily reliable because of the human element involved in the evaluation. It is desirable to eliminate the necessity for the exercise of judgment on the part of the operator in evaluating the results and indicating the source of difficulty. Not only can a more accurate determination be made, but by removing the necessity of judgment on the part of the operator, confidence in the integrity of the operator can be greatly enhanced and the ability of unscrupulous operators to defraud can be greatly reduced.

Accordingly, it is an object of the present invention to provide improved methods for performance analysis.

It is another object of the present invention to provide improved apparatus for performance analysis.

It is an additional object of this invention to provide improved methods of engine performance analysis.

It is a further object of this invention to provide a novel system for use in engine performance analysis.

Another object of this invention is to provide means for receiving input data, such as may be derived from an engine, and providing an evaluation thereof in a simple and efficient manner.

In accordance with the exemplary embodiment of the present invention, performance analysis utilizing novel methods and apparatus is provided for simply and efficiently performing various tests upon equipment, such as an internal combustion engine and providing an evaluation of the test data with respect to standardized data. Apparatus constructed according to the present invention may utilize a plurality of transducers and associate electronic equipment, such as probes, in order to obtain electrical signals having a meaning in terms of the various aspects of engine performance. One or more of the input signals is automatically selected, and may be operated upon to provide signals which may be utilized more readily and automatically evaluated. Typically, such data is automatically compared with predetermined programmed data, which may include certain limit values within which the test data should fall, and provide a visual and/or recorded output indicative of the results of the automatic test and evaluation. As an example, a punched card or other similar means may be utilized for providing input program data including, or utilized with, function and control data, for directing the tests which are to be made, providing acceptable limits for test data, etc. The test or tests are automatically performed while providing an indication of the test being performed, the test data resulting from the test, and an evaluation of whether or not this test data falls within the limits specified by the input program. This resulting information may be indicated only visually, or a record may be made thereof by suitable means, such as a printer.

These and other objects and features of this invention will become more apparent through a detailed consideration of the following description taken in conjunction with the accompanying drawings in which:

FIGURE 5 is a block diagram of a logic and function generator together with appropriate counters.

FIGURES 6 and 7 are diagrams of circuit and logic components used in certain portions of the system shown in FIGURE 5;

FIGURE 8 is a time chart showing the functions of FIGURES 6 and 7;

FIGURES 10a–10c illustrate in block diagram form comparators which may be utilized in the apparatus of FIGURE 1.

Figure 1:
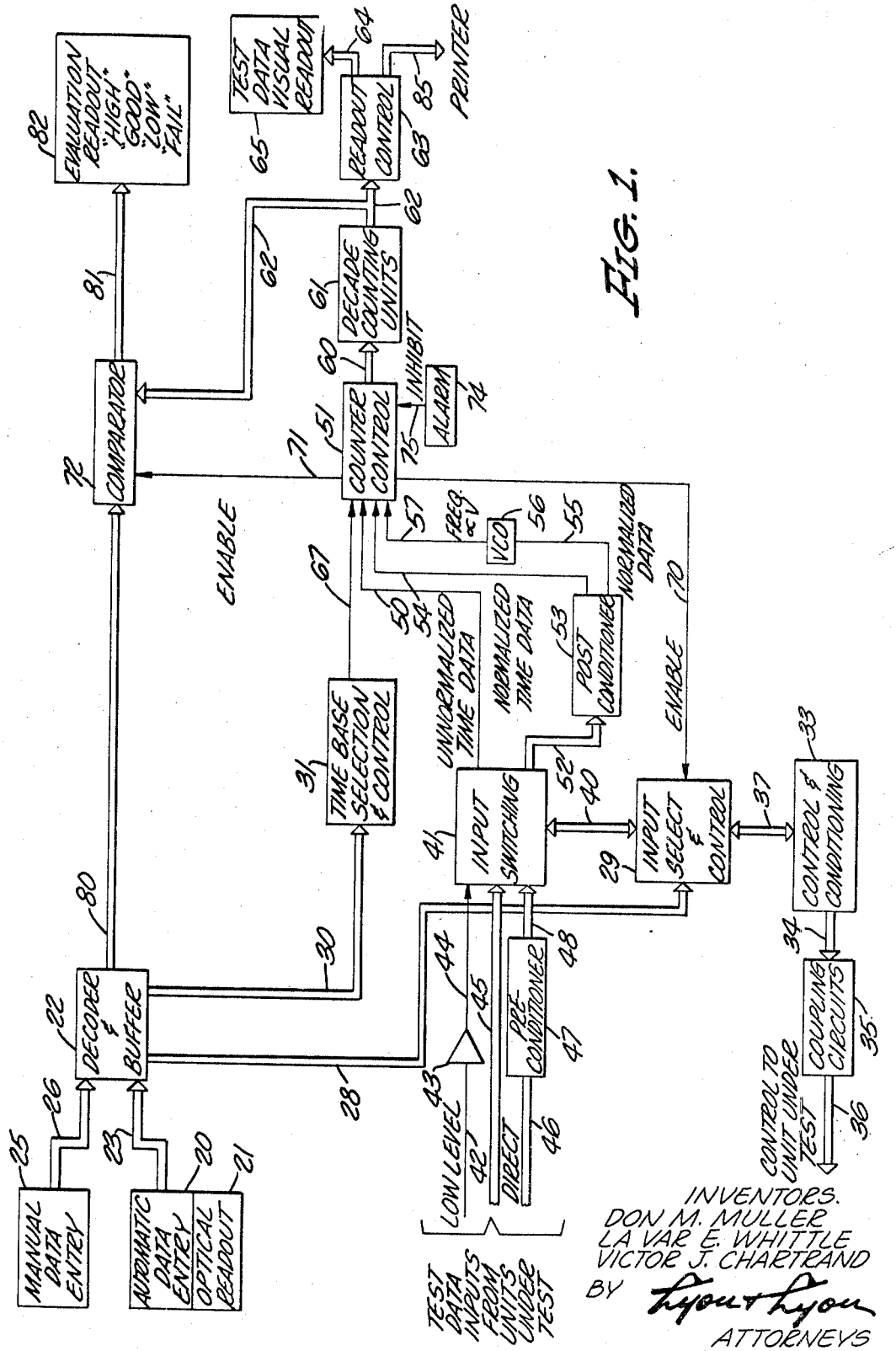
FIGURE 1 is a block diagram of a performance analysis system constructed in accordance with the teachings of this invention.

Although not intending to be limited thereby the concepts of performance analysis in accordance with this invention will be discussed in conjunction with automobile engine tests. Such tests may be carried out on a wide variety of equipment wherein the parameter or parameters to be measured are capable of being converted or transduced to an electrical signal and standards pertaining thereto are available or can be derived. A wide variety of tests may be performed on a unit, such as an engine, with a minimum of operator skill through an electronic scanning of programmed test parameters which are automatically compared with actual test measurements. A program may be provided in various ways, a punched card being particularly convenient. Internal function control or data may be provided by similar means, or may be provided internally and scanned or interrogated along with the input program on the punched card. Typically, the punched card will form a portion of a larger master card which will be inserted into a card reader associated with the analyzer, the master card further providing visual instructions and indicia (such as a printed indication of the tests being performed, transducer connections which must be made, required engine setting, i.e., r.p.m., etc.). In this manner, detailed test data can be made available for nearly every type of engine by the simple insertion of a single card. This technique facilitates ease in preparation, revision, distribution, and storage of test programs for various engines and vehicles.

The operator merely inserts the card into the card reader and sequentially selects each test by advancing the card a predetermined distance through the reader by means of a suitable knob or the like. It will be apparent that the advance of the card may be performed automatically, if desired. As the card is advanced from position to position, the tests are performed automatically. The result of each test, as well as the result of a comparison of certain resulting test data with a predetermined limit data, are displayed by suitable visual readouts, and may be recorded by a printer or other suitable recording device. Self checking features for the analyzer itself may be provided internally as will be apparent to those skilled in the art for further increasing the reliability of the analyzer and confidence in the tests and evaluations made thereby. In its simplest form, the analyzer is electrically similar to a digital voltmeter having input signal conditioning and a plurality of selectable inputs, with the output thereof being fed into a digital counter. The operation of the voltmeter and counter is controlled from a program, and comparison means is provided for comparing certain output test data with input standard limit data. Readouts are provided for indicating the value of test data as well as the results of the comparison. Measurements may be made of essentially and subsystem or component of a vehicle, or other unit, in which the parameter to be measured can be converted or transduced to an electrical signal. Examples of typical tests to be made on an internal combustion engine include battery voltage, starter current, ignition timing, dwell angle, r.p.m., etc.

Figure 2:
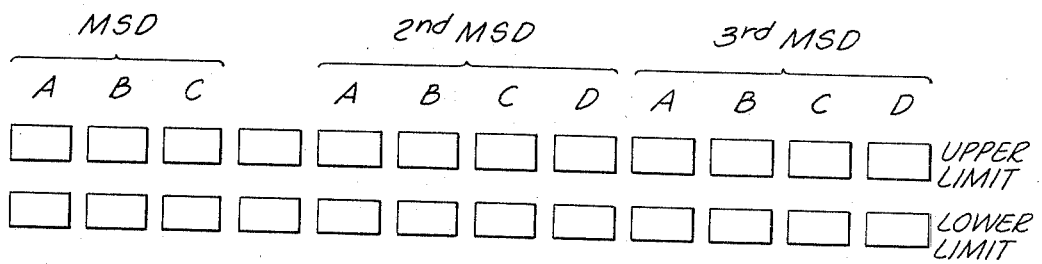
FIGURE 2 illustrates the format of program data having limits within which test data should fall.

Referring now to the drawings, and particularly to FIGURE 1, an automatic data entry 20 having an optical readout 21 is provided. The automatic data entry means 20 may include any suitable apparatus for entering data, preferably in a digital code form, into the analyzer of the present invention, and may include any suitable input device such as a punched card reader, punched tape reader, magnetic tape unit, etc. As briefly mentioned heretofore, typically, the automatic data entry means 20 includes a punched card reader for interrogating coded information on a punched card in the form of punched holes or a photosensitive material having coded areas thereon. In one form of the invention, a punched card having 12 columns may be utilized with binary information indicated by punched holes in each two rows providing a limit data word for each test within the bounds of which the test data should fall, an upper row providing the upper limit value and the lower of each two rows providing the lower limit value. As illustrated in FIGURE 2, for example, a limit data word may include 24 bits, twelve being in each of the two rows. In the first row the first four bits, A, B, C and D, indicate the high value of the most significant digit, (MSD), of the limit word data, the next four bits indicating the high value of the second most significant digit, the first four indicating the high value of the third most significant digit. Similarly in the second row the three sets of four bits each indicate the low values of the three digits of the limit data word. Although the most significant digit may include four bits for both upper and lower limits, this could be reduced to three bits as shown in FIGURE 2 so that the extra bits may be used for other purposes such as to indicate the number of cylinders under test or some other condition or control parameter. It may also be desired to reduce the number of bits consumed on a card by reducing the number of bits used for limit data words. Thus, the MSD could be reduced to only four bits providing no limits; and the third MSD could be approximated by using only two bits for the high limit and two for the low limit, such bits to provide third digit values of 0, 3, 6 and 9. The card reader included in the automatic data entry means 20 includes suitable means for interrogating two rows of a card at a time. For example, a light source may be placed on one side of the card, with light responsive devices such as photovoltaic cells positioned on the other side of the card adjacent each bit positioned for two rows. The data word can thus be interrogated by the card reader and fed into a decoder and buffer 22 through a cable 23.

Preferably, the automatic data entry means 20 also includes signal generating means for generating a function and control program as the card reader generates the limit data word from the punched card. Of course, the function and control program may be included on the punched card. However, if separate means are provided in the automatic data entry means 20 for generating a function and control program, it may take various forms including another punched card that moves along with the input punched card. Preferably, a coded printed circuit board, which may be removed for changing the function and control program if necessary, is included in the card reader, and the table which advances the input punched card also moves contacts across the printed circuit board to generate bits similar to the limit data word illustrated in FIGURE 2 for indicating certain functions and control operations to take place as each test is being formed as well as a bit on code to indicate the start of a test. For example this latter information indicates which of a plurality of input lines should be switched or connected for digitizing within the analyzer, as well as the count time base for the counter. The input punched card may include thereon preferably on a larger card to which it is attached, printed information pertaining to the test being made which in turn may be visually observed by an operator by means of the optical readout 21. This printed information includes the test being performed, the connections to be made, required engine settings, (i.e., r.p.m.) for the test, etc.

The manual data entry means 25 is also connected through a cable 26 to the decoder and buffer 22. The manual data entry means 25 includes a plurality of manually operated switches for enabling the manual generation of bits of data, such as a limit data word as shown in FIGURE 2. Additionally, the manual data means 25 may include the power switch for the overall analyzer, the other switches and controls for other desired functions, such as for resetting the various components, providing start or sync pulses, etc.

The decoder and buffer 22 receives the input data and essentially routes it to the proper portions of the analyzer as well as provides a buffer between input data entry circuitry and other components of the analyzer. Thus, the decoder and buffer 22 receives the coded information indicating which test should be performed, whether this information be derived from the punched card, function and control data generating circuitry, or the manual data entry means 25, and routes this information through a cable 28 to an input select and control circuit 29, and through a cable 30 to a time base selection and control circuit 31. The decoder and buffer 22 may include conventional logical circuitry for routing bits or groups of the information received thereby to the appropriate portion of the analyzer. For example, the input data may indicate that r.p.m. of an engine is to be measured, and this portion of the input data is routed through the decoder and buffer 22 to the input select and control circuit 29 which in turn causes the appropriate input (i.e., an input from the distributor or spark plug cables) to be connected to following circuitry. The information received by the input select and control 29 may also be used in a conventional manner to select control and conditioning circuitry which, through a cable 34, appropriate coupling circuits 35, a cable 36 and transducers associated with the engine, causes the engine to perform certain operations such as start, change speed, open or close points, or adjust fuel-air mixture by means of suitable transducers coupled with the carburetor. Suitable signals may pass between the input select and control circuit 29 and the control and conditioning circuits 33 through a cable 37 for conditioning and enabling the coupling circuits 35 to send signals to the engine transducers and for indicating that this action has taken place. The input select and control 29 essentially receives certain data in the form of bits or groups of bits from the decoder and buffer 22 and in turn signals the control and conditioning circuit 33 to cause certain desired engine operations to take place. For example, a simple servosystem may be connected with the accelerator pedal or throttle linkage coupled with the engine carburetor for setting engine speed in response to a binary coded word or group of bits indicative of the desired speed. Other engine parameters similarly may be controlled. A similar signal, for example, may cause a resistive shunt to be placed across the battery or generator for providing a predetermined load thereon during a load voltage or current test thereof.

The input select and control circuit 29 is coupled through a cable 40 to an input switching circuit 41 which may comprise conventional relay or electronic logical switching circuits for selecting any one or more desired input or inputs. For example, a low level input line 42 is connected through an amplifier 43 for amplifying low level signals and applying these signals through a line 44 to the input switching circuit 41. Certain inputs, such as battery voltage, starter current, etc., may be measured directly and thus are connected directly through a cable 45 to the input switching circuit 41. Certain signals derived from an engine preferably should be conditioned, e.g., certain voltages may need dividing, certain pulses may need shaping or filtering, the transition of a signal from one level to another may be detected for generating pulses, etc. Thus, an input cable 46 for receiving such signals is coupled through a preconditioner circuit 47 comprising conventional circuits and a cable 48 to the input switching circuit 41. The preconditioner circuit 47 may include appropriate dividing circuitry such as a potentiometer divider for dividing an input voltage; filters such as suitable reactive components for filtering out noise signals; threshold detector circuitry for detecting a signal transition from one value to another, etc.

The input switching circuit 41 includes an output line 50 connected to a counter control circuit 51, and a cable 52 connected to a post conditioner circuit 53. The output of the circuit 53 is connected through a line 55 to a voltage controlled oscillator 56 which in turn is connected through a line 57 to the counter control 51. The input switching circuit 41 serves to select one or more inputs which are passed to the counter control 51 or the post conditioner circuit 53. For example, in measuring r.p.m., the firing voltage pulse of the first spark plug derived from the distributor or plug cable may be fed through the cable 45, the input switching circuit 41, the cable 52, the post conditioner circuit 53, which shapes this voltage into a more usable pulse form, and through the line 54 to the counter control 51 for direct counting thereof. The post conditioner circuit 53 may include one or more voltage to frequency converters (VFC), such as voltage controlled oscillators, to convert voltages to frequency signals. Specific examples of these components will be discussed subsequently.

The counter control 51 is connected through a cable 60 to a plurality of decade counting units 61 which in turn are connected through a cable 62, a readout control circuit 63 and a cable 64 to a visual readout 65 which provides a visual indication of test data. The counter control 51, decade counting units 61, readout control 63 and readout 65 essentially comprise a conventional digital counter. The time base selection and control circuit 31 is connected through a line 67 to a counter control 51. The time base selection and control 31 may comprise a fixed frequency source, such as an oscillator, and conventional circuitry coupled thereto, such as a frequency divider for supplying selectable frequencies to the counter control 51 to serve as respective time bases for counting. The circuit 31 further may include a voltage controlled oscillator for providing a variable time base frequency as will be discussed subsequently. The particular time base generated is selected in response to bits of information transferred from the decoder and buffer 22 which are included in the function and control program derived from the automatic data entry means 20.

In order to allow the counter control 51 and decades 61 to complete a counting operation before further tests or measurements are made, the counter control 51 supplies an enable signal after counting is completed through a line 70 to the input select and control circuit 29, and an enable signal through a line 71 to a comparator 72. These enable signals allow the input select and control circuit 29 and the comparator 72 to commence operation at appropriate times. As will be apparent to those skilled in the art, various signals which may be derived from a master clock or oscillator, may be supplied to each of the components of the overall system to enable synchronization of the operation thereof.

Additionally, various self-checking features may be provided which generate signals to inhibit the operation of the system or any desired component or components thereof whenever an alarm condition exists. An alarm circuit is diagrammatically illustrated at 74 coupled through a line 75 to supply an inhibit signal to the counter control 51. Typical alarm conditions include improper card insertion which may be detected by switches associated with the card reader, improper electrical input connections, such as, reversed connections which may be detected by improper or excessive input signal levels, improper conditioning of the engine under test by the control and conditioning circuit 33 as indicated for example by the engine not achieving the selected speed, overloaded power supply, etc. The alarm signals may be used to operate devices, such as lamps, for providing indications of alarm conditions or giving instructions such as "check r.p.m." when that is important.

In order to provide an evaluation of test data with reference to limit data input, the decoder and buffer 22 is connected through a cable 80 to the comparator 72 to supply the limit data word (see FIGURE 2) for each test thereto. The cable 62 from the decade counting units 61 is also coupled to the comparator 72 and the output thereof is coupled through a cable 81 to an evaluation readout 82. As will be described in greater detail subsequently, the comparator 72 compares the limit data word for each test with the resulting test information from the decade counting units 61 and provides an output indicating whether the test information is "low," "good" or "high," and further provides a "fail" indication.

In addition to the visual readout 65 for test data, the readout control 63 may be coupled through a cable 85 to a suitable recording device, such as a printer. The recording device would provide a permanent record of an entire sequence of tests. The readout control 63 preferably includes a storage register or the like for storing the information for readout, i.e., for the readout 65, printer, etc. while the decade counting units 61 are accumulating new test information.

Additionally in making a thorough check of an automobile, there may be certain aspects thereof to be checked which are not susceptible of conversion to electrical signals. For example, this may include the condition of the tires, oil leaks, and similar checks. The manual data entry 25 may include band held devices which may be coupled directly through the cable 85 to a printer to provide "good-bad" indications opposite any number of predetermined tests or inspections in conjunction with the test results provided by the electronic circuitry.

Figure 3:
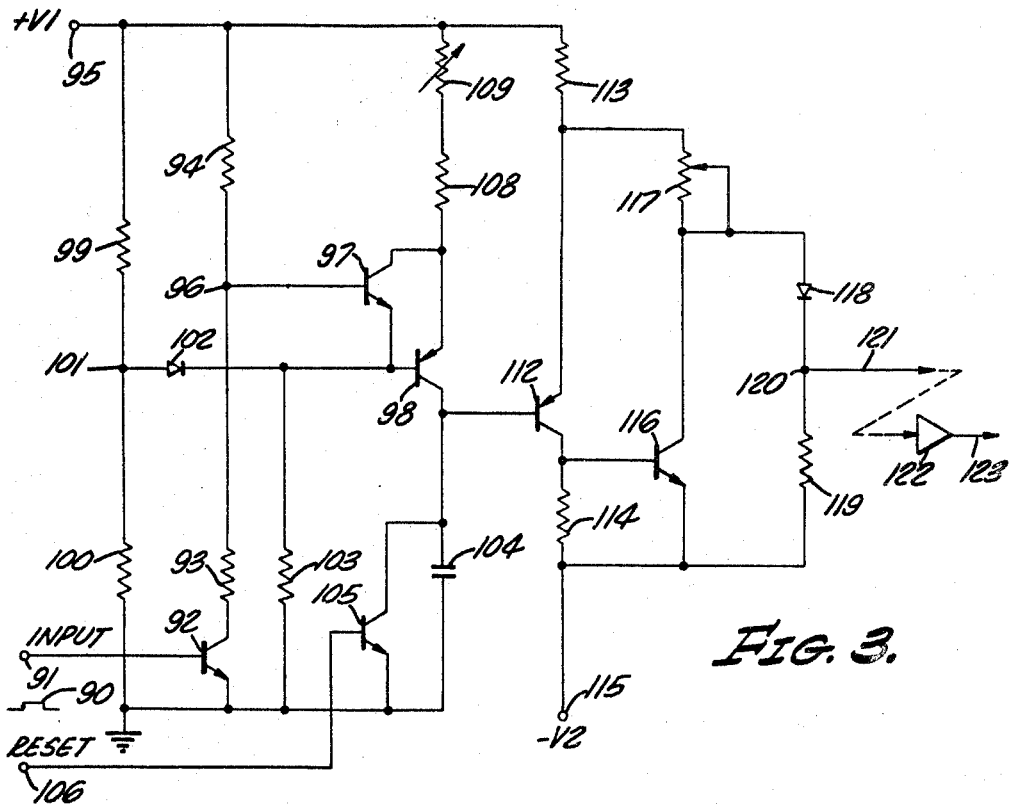
FIGURES 3 and 4 are diagrams of the circuits which may be utilized in certain portions of the apparatus illustrated in FIGURE 1.

FIGURE 3 illustrates a time, or pulse duration, to voltage converter. This circuit receives an input pulse 90, and provides an output voltage proportional to the duration of the input pulse 90. The pulse 90, for example, may be generated by a flip-flop triggered by two successive pulses from the distributor of a spark plug lead. It may include a time to voltage converter of this nature for generating a normalized voltage data output on the line 55 in response to input time data, such as spark plug firing signals for the measurement of r.p.m. or dwell angle, and a circuit of this type can be included in control and conditioning 33 for capacitance checks and the like. The converter in FIGURE 3 includes an input terminal 91 to which the pulse 90 is applied, coupled to the base of an npn transistor 92. The emitter of transistor 92 is connected to ground, and the collector thereof is connected through resistances 93 and 94 to a positive voltage terminal 95. A central terminal 96 between the resistances 93 and 94 is connected to the base of an npn transistor 97. The collector and emitter of the transistor 97 are connected across the emitter and base of a pnp transistor 98. A voltage divided comprising resistance 99 and 100 is coupled between the terminal 95 and ground, and has a central terminal 101 connected through a diode 102 to the base of the transistor 98. A resistance 103 is connected between the base of the transistor 98 and ground. The diode 102 and resistance 103 serve as a temperature compensation network.

The collector of the transistor 98 is connected through a capacitor 104 to ground, and an npn transistor 105 has its collector and emitter coupled in parallel with the capacitor 104. A reset input terminal 106 is coupled to the base of the transistor 105. The emitter of the transistor 98 is connected through a resistance 108 and a variable resistance 109 to the terminal 95. The collector of the transistor 98 is connected to the base of a pnp transistor 112 which has its emitter coupled through a resistance 113 to the terminal 95 and its collector coupled through a resistance 114 to a negative voltage terminal 115. The collector of transistor 112 is also connected to the base of pnp transistor 116, the emitter of which is connected to terminal 115 and the collector is coupled through a potentiometer 117 to the emitter of the transistor 112. A diode 118 and resistance 119 are coupled across the collector-emitter path of the transistor 116. A terminal 120 intermediate the diode 118 and the resistance 119 is connected to an output line 121. For certain purposes to be described subsequently, the output line 121 may be connected through a conventional inverting amplifier 122 to provide an output voltage which is the inverse of its input.

Basically, the converter circuit shown in FIGURE 3 consists of a constant current source driving a capacitance which is followed by a hold network. Upon the receipt of an input pulse 90, the transistor 92 turns on, the transistor 97 turns off and the transistor 98 turns on. The voltage at the collector of the transistor 98 is related to the time input (the duration of the pulse 90) and allows the capacitor 104 to charge while the input pulse 90 is present. The transistor 112 and 116 and associated circuitry function to maintain or hold the charge and provide a DC output linearly related to the duration of the input pulse 90. The transistor 105 may be turned on by a reset pulse applied to the terminal 106 to discharge the capacitor 104. The variable resistance 109 enables the rate of charge of the capacitor 104 to be adjusted in order to provide a linear output voltage versus time input. The potentiometer 117 provides a zero adjustment to offset any initial low charge on the capacitor 104 so that the converter starts with a zero output.

The inverting amplifier 122 is utilized on the output of the converter shown in FIGURE 3 in conjunction with dwell angle measurements for providing an output voltage on the line 123 directly proportional to the r.p.m. of the engine. It will be appreciated that if the firing voltage pulses for spark plug number 1 are applied to a flip-flop to generate a pulse 90 having leading and trailing edges defined by successive firing pulses, the width of the pulse 90 decreases as r.p.m. increases and likewise the output voltage at the line 121 decreases. As will appear subsequently, to make dwell linearly related to r.p.m., the voltage on the line 121 is inverted by the amplifier 122 to provide this desired output voltage on the line 123.

Figure 4:
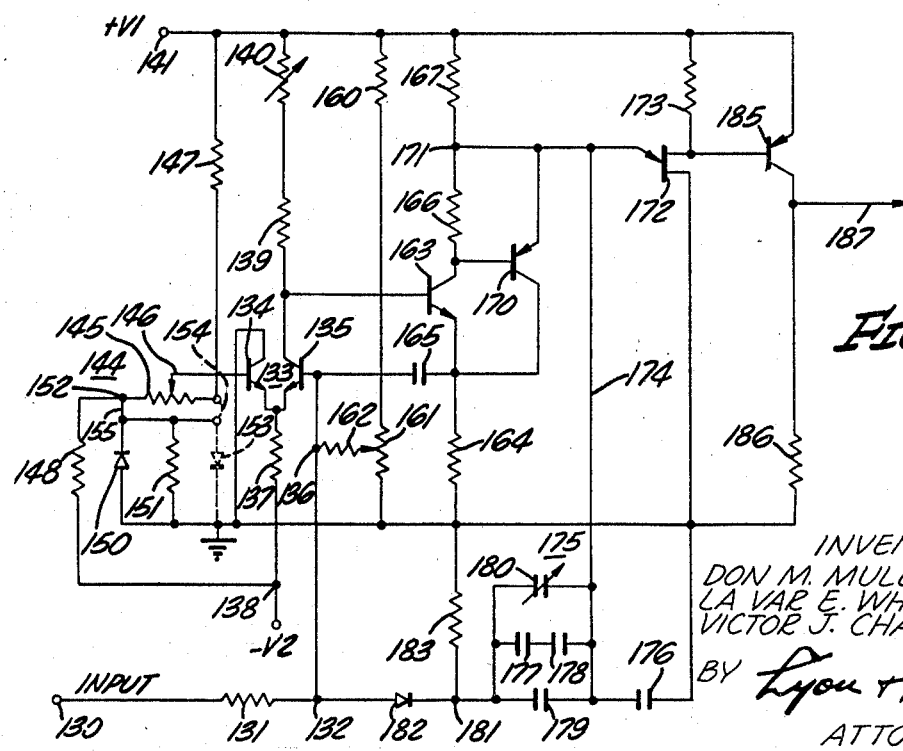

A voltage to frequency converter (VFC) in the form of a voltage controlled oscillator is illustrated in FIGURE 4. This circuit functions to convert an analog input, such as a voltage input pulse representing time or frequency. Thus, the output of the converter shown in FIGURE 4 is a frequency which is proportional to an input voltage applied thereto. The input voltage is applied to an input terminal 130 which is coupled through a resistance 131 to a summing junction 132 of a differential amplifier 133. The differential amplifier 133 includes a pair of npn transistors 134 and 135, and the summing junction 132 is connected through a line 136 to the base of the transistor 135. The emitters of the transistors 134 and 135 are coupled through a resistance 137 to a negative voltage terminal 138. The collector of the transistor 134 is connected to ground, and the collector of the transistor 135 is connected through a resistance 139 and a variable resistance 140 to a positive voltage terminal 141. A reference source 144 includes a potentiometer 145 having a tap coupled through line 146 to the base of the transistor 134. The ends of the potentiometer 145 are coupled through respective resistances 147 and 148 to the voltage terminals 141 and 138, respectively. A diode 150 and variable resistance 151 are connected in parallel from a junction 152 between the potentiometer 145 and resistance 148 to ground. The potentiometer 145 and resistances 147 to 148 form a divider for supplying a reference signal to the base of the transistor 134.

A diode 153 (shown in dotted lines) may be connected in parallel with the resistance 151 instead of the diode 150, along with the conductive connection 154 (shown in dotted lines), between the diode 153 and the junction between the potentiometer 145 and resistance 147 instead of a conductive connection 155 between the junction of the potentiometer 145 and resistance 148 and the diode 150. Either one or the other of the diodes 150 and 153 is used, and the combination thereof with the variable resistance 151 provides a temperature compensation network for aiding in balancing the transistors 134 and 135. Additionally, the resistance 148 is made larger if the diode 153 is used rather than the diode 150. If the $V_{be}$ of the transistor 135 is larger than that of transistor 134, the diode 150 is used in the circuit to balance the two transistors, and if the converse is true, the diode 153 is used. The variable resistance 151 varies the diode current and provides an additional adjustment of temperature compensation to aid in providing the proper output frequency irrespective of temperature changes.

A voltage divider including a resistance 160 and a potentiometer 161 is connected from the terminal 141 to ground, and a resistance 162 is coupled from the movable tap of the potentiometer 161 to the base of the transistor 135. The collector of the transistor 135 is connected to the base of an npn transistor 163. The emitter of the transistor 163 is connected through a resistance 164 to ground and through a feedback capacitance 165 to the base of the transistor 135. The collector of the transistor 163 is connected through resistance 166 and 167 to the terminal 141. The collector of the transistor 163 is also connected to the base of a pnp transistor 170 which has its collector directly coupled to the emitter of the transistor 163, and its emitter coupled to a terminal 171 between the resistances 166 and 167. The emitter of the transistor 170 also is directly connected to the emitter of unijunction transistor 172 which has one base thereof connected to ground and the other base thereof connected through a resistance 173 to the terminal 141. The emitters of the transistors 170 and 172 are connected through a line 174 to a capacitor bank 175. The capacitor bank 175 includes a capacitor 176 coupled between the line 174 and ground. Also included in the capacitor bank 175 is a pair of series connected capacitors 177 and 178 coupled in parallel with a capacitor 179 and a variable capacitor 180 between the line 174 and a terminal 181. The terminal 181 is connected through a diode 182 to the summing junction 132, and through a resistance 183 to ground.

A pnp transistor 185 has its base coupled from the junction of the resistance 173 and the upper base of the transistor 172, its emitter connected to the terminal 141, and its collector connected through a resistance 186 to ground. The collector of the transistor 185 is connected to an output line 187. The output on the line 187 is a frequency determined by the rate of turn-on and turn-off of the unijunction transistor 172 as amplified by the transistor 185. An input voltage applied to the input terminal 130 causes the current to flow into the summing junction 132 which is combined in a negative feedback relationship with a current from the capacitor bank 175 through the diode 182, to form an error current. An error current is applied to the base of the transistor 135 which effectively provides an output signal to the base of the transistor 163 dependent upon the deviation of the error current from a reference applied to the base of the transistor 134. The output from the transistor 135 is amplified by the transistors 163 and 170 and applied to control the unijunction transistor 172. As the voltage at the emitter of the unijunction transistor 172 increases, this transistor ultimately conducts lowering the line 174 to ground and discharging the capacitor 176, thus discharging the capacitor bank 175 essentially to ground. This action causes a negative current pulse to pass through the diode 182, with the foregoing operation continuing at a frequency which tends to maintain the error current to the base of the transistor 135 at zero, or essentially zero.

The converter circuit illustrated in FIGURE 4 is adjusted by initially shorting the summing junction 132 to ground and adjusting the base of 134 to zero and then the variable resistance 140 to provide a voltage output from the transistor 135 at which the unijunction transistor 172 just begins to oscillate. The maximum input voltage is applied to terminal 130 and the capacitor bank 175 is adjusted by adjusting the variable capacitance 180 to give the desired output frequency for that input voltage, and then the lowest input voltage that will be encountered is applied to the input terminal 130 and the potentiometer 161 is adjusted for the correct output frequency. The circuit is operated and checked for proper temperature compensation. If the temperature compensation is not correct, the resistance 151 is varied to provide a suitable temperature correction.

The converter, or voltage controlled oscillator, illustrated in FIGURE 4 may be employed in the post conditioner circuit 53, the time base selection and control circuit 31, and the voltage controlled oscillator (VCO) 56. Typically, two of these VFC's are used in the post conditioner circuit 53, one for use in dwell measurements, and the other for use in r.p.m. measurements. Typically, two of these VFC's shown in FIGURE 4 are used in the time base selection and control circuit 31 to provide groups of selectable output frequencies by switching different input voltages thereto. Typically, one VFC may provide outputs of 10 kilocycles, 1 kilocycle and 100 cycles by connecting respective input voltages thereto, and another used to provide frequencies, such as, 10 cycles and 1 cycle, in a similar manner. For example, the counter control 51 includes a conventional count gate which may be opened by input test data pulses thereto to allow time base pulses from the time base and control circuit 31 to pass to the decade units 61 which accumulate the time base pulses for the period of time during which the gate is open. The count gate also can be used in the opposite manner, that is, be opened by time base pulses while allowing input test data pulses to pass to the decade units 61.

In making an r.p.m. measurement for example, a pulse 90 (see FIGURE 3) developed from successive distributor point closures or the firing voltage pulses from a plug cable as described previously are applied to the converter in FIGURE 3 to provide an output voltage proportional to the duration of the pulse, with the output line 121 of the converter in FIGURE 3 being applied directly to the input terminal 130 of the VFC in FIGURE 4. This VFC provides a frequency output proportional to the voltage input and this output is applied to the counter gate within the counter control 51 which in turn passes time base pulses (for example 10 kilocycle pulses) during the time the gate is open. For 1.1 cycles per second output from the VFC applied through the line 54 to the counter control 51, and a time base of 10,000 cycles per second applied through the line 67 to the counter control 51, the decade counting units 61 accumulate the time base pulses for approximately .9 second (the time the count gate is open as determined by 1/1.1 thereby accumulating approximately 9,000 time base pulses and providing an indication thereof on the readout 65 of 9,000 r.p.m. In a similar manner, if the output from the VFC is 33 cycles per second and used to gate the count gate, time base pulses are counted for a time (approximately .03 second) equal to the inverse of 33 cycles which results in an r.p.m. indication of approximately 300 r.p.m. Thus, pulses from the distributor or plugs having a repetition rate proportional to r.p.m. are used to generate pulses having a duration which is longer for low r.p.m. These pulses are converted to an equivalent voltage by the converter in FIGURE 3; that output is converted to a frequency proportional to the voltage (i.e., a higher frequency for low r.p.m.) by the VFC and this frequency is then utilized to gate the counter gate to allow the passage of time base pulses which are accumulated in the decade counting units 61 and indicated by the readout 65 directly as r.p.m.

Figure 9:
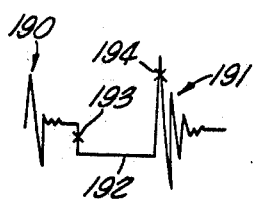
FIGURE 9 is a waveform illustrating an example input signal which may be utilized in an engine evaluation.

FIGURE 9 illustrates a typical dwell time (or dwell angle) waveform derived from the primary winding of an ignition coil. Accompanying the closing and opening of the distributor breaker points are transients 190 and 191, with a clean waveform therebetween. Dwell time varies inversely as r.p.m.; that is, the dwell time becomes shorter as r.p.m. increases. Certain difficulties are encountered in measuring dwell because of r.p.m. changes which produce varying indications. By sampling the t.p.m. by deriving pulses from successive breaker point openings or closings, or from plug firing voltage pulses, and generating a time base frequency proportional to r.p.m. which in turn is counted during the dwell time, an accurate measurement of dwell time may be made under dynamic engine conditions thereby eliminating the necessity of special r.p.m. adjustments for such dwell measurements or initial calibrations such as presently needed with oscilloscopic testing equipment.

The foregoing may be accomplished by detecting points 193 and 194 on the dwell time waveform by a suitable conventional threshold or transition detector to provide respective open and close pulses for the count gate in the counter control 51. These pulses may be generated in the post conditioner circuit 53 and supplied to the counter control 51 through the line 54. Since dwell time decreases as r.p.m. increases, the spacing between these pulses likewise decreases. Time base pulses, which will be accumulated by the decade counting units 61 while the count gate is open, initially are derived in any suitable manner, such as from successive breaker point closures, from successive plug firing voltage pulses, etc., and used to generate pulse 90 shown in FIGURE 3. The time to voltage converter in FIGURE 3 which is included in the post conditioner circuit 53 provides a voltage output proportional to the time between points closures (or plug firing voltage pulses) which is inversely proportional to r.p.m. This output from the converter is applied to an inverting amplifier 122 in FIGURE 3 which provides a voltage output on the line 123 directly proportional to r.p.m. This voltage is supplied to the VCO 56 in FIGURE 1, through the line 55, and thus to the input terminal 130 of the voltage controlled oscillator in FIGURE 4, which shows the circuit of a suitable VCO 56, which in turn generates an output frequency directly proportional to r.p.m. This output frequency is applied through the line 57 in FIGURE 1 (line 187 in FIGURE 4) to the counter control 51 and is gated by the count gate therein between the points 193 and 194 on the dwell time waveform shown in FIGURE 9 as generally discussed above. Hence, the frequency output from the VCO 56 is accumulated in the decade counting units 61 during the dwell time, and the readout 65 provides a numerical output indicating the dwell time. It has been found that this dwell measurement takes a maximum of approximately 3 revolutions, and thus no special r.p.m. adjustment is required therefor. The inertia of an engine will cause the r.p.m. to remain substantially constant during this measurement. Thus, in summary, a time base is generated by the VCO 56 which is proportional to r.p.m. is accumulated during the dwell period and the readout 65 provides a direct indication of dwell time or angle.

FIGURE 5 illustrates an overall block diagram of alternate circuitry for developing an output frequency directly proportional to an input frequency, other than that shown in FIGURES 3 and 4, and this circuitry has particular application for the measurement of r.p.m. and dwell angle where the input frequency is derived from distributor point closures or the firing voltage pulses from a selected spark plug. This particular is simpler and more accurate than that of FIGURES 3 and 4. A clock input is provided at 300 and this input may be connected directly to a spark plug or to the distributor points such as through the direct connection 45 of FIGURE 1. The function control logic 301 provides a number of outputs in a manner which will be more completely described subsequently. A reset pulse is provided on line 301 and a reset and ramp pulse is provided on 303 both of which are coupled directly to the function generator 304. A time delay start pulse is provided on line 305 from the function control logic 301 and initiates a time delay pulse from the time delay 306, that time delay pulse being carried on line 307 to the voltage controlled oscillator 308. Time delay 306 provides a time delay of fixed duration and through line 309 coupled back to the function control logic 301 holds the operation of the function control logic until the expiration of that time delay pulse.

In response to the reset and the reset and ramp functions input to the function generator 304, which both respond directly to the frequency of the clock input pulse, the function generator produces an output on line 310 having a voltage directly proportional to the input frequency. This voltage, designated $V_A$, is coupled through line 310, through a high impedance buffer stage 311 and onto line 312 into voltage controlled oscillator 308. The operation of VCO 308 has been more completely described above as it is the same as that shown in FIGURE 4, and it is sufficient at this point to say that the output frequency of VCO 308 is directly proportional to the input voltage. The output of the VCO 308 is fed through line 313 to a counter such as the counter 61 in FIGURE 1 and thence to appropriate decoder logic and readout apparatus as desired.

The circuitry of FIGURE 4 can also be employed for the measurement of dwell angle. Since the output is directly promotional to the input frequency, no inverting amplifier is required. At the output of the high impedance buffer stage 311 the line 314 is coupled to the input of VCO 315 of the same type as VCO 308 and the output of VCO 315 is coupled through line 316 to the counter 61. By appropriately gating the counter 61 with a conventional threshold detector responsive to points 193 and 194 of the curve in FIGURE 9, as previously related, a numerical output indicating dwell angle will be obtained.

Referring now to FIGURE 6, the operation of the function control logic 301 will be described. The logic circuit includes three flip-flops 320, 321 and 322, a NAND gate 323 and an inverter 324. At time before the first clock pulse, it is assumed that flip-flops 321 and 322 have Q's at logical zero and $\overline{Q}$'s at logical one and flip-flop 320 has a Q at one and a $\overline{Q}$ at zero. The first clock pulse into flip-flop 320 causes flip-flop 320 to change providing a logical one at $\overline{Q}$ which is coupled through line 325 to NAND gate 323. Q of flip-flop 320 changes to logical zero and is coupled through line 326 to flip-flop 321. This causes flip-flop 321 to flip and provide logical one at its Q the output of which is coupled through line 327 directly to the other input of NAND gate 323. This causes NAND gate 323 to provide an output of logical zero (not $\overline{\text{reset}}$) which is inverted by inverter 324 providing a logical one (reset) at line 328. The logical one at Q of flip-flop 321 is likewise coupled through line 329 to provide a logical one at output 330 for the reset and ramp.

After the second clock pulse at line 300, flip-flop 320 again flips providing a logical one at Q and a logical zero at $\overline{Q}$. The logical zero at $\overline{Q}$ is coupled directly to NAND gate 323 whose output thereupon becomes a logical one which is in turn inverted to inverter 324 to provide a logical zero signifying the end of the reset pulse at 328. The third clock pulse again causes flip-flop 320 to flip and the Q thereof goes again to logical zero thereupon causing flip-flop 321 to flip to provide logical zero at its Q and that logical zero coupled through line 329 ends the reset and ramp pulse. The Q of flip-flop 321 is also coupled through line 331 to the input of flip-flop 322 and the logical zero at the Q of flip-flop 321 causes flip-flop 322 to flip providing a logical one at Q starting the time delay pulse on line 305. Line 307 is also coupled to the time delay start line 305 and provides an output thereon. Flip-flop 322 provides a logical zero at $\overline{Q}$ which in turn is coupled through line 332 to flip-flop 321 to provide a $\overline{\text{time delay}}$ in order to hold flip-flop 321 in the reset mode during the period of the time delay pulse.

At the end of the fixed time delay provided by time delay 306, a negative pulse $\overline{TDOS}$ occurs asynchronously on line 309 extending back to the reset input of flip-flop 322, resetting flip-flop 322 to a zero at Q and a logical one at $\overline{Q}$. The logical one at $\overline{Q}$ thereby enables flip-flop 321 to again assume the reset mode when the next clock pulse is received. Assuming that two clock pulses occurred during the time delay, the next pulse which will initiate the reset and the reset and ramp functions will be numbered six or seven depending upon the state of flip-flop 320 and the next pulse will synchronously start the same cycle as above described. Reference may be had to FIGURE 8a which is a timing chart showing the relationship between the clock input, the reset, the reset and ramp and the time delay.

A frequency to voltage converter in the form of a function generator and hold circuit is illustrated in FIGURE 7. This circuit receives the reset and the reset and ramp functions and provides an output voltage proportional to the frequency of the clock input. This particular circuit generates a voltage output in the form of an hyperbolic function. While the circuit described in connection with FIGURE 3 provides a means for generating a workable function by straight line approximations, the present circuit is considerably simpler and it eliminates the necessity for constant current sources, differential amplifiers, reference source and the switching of current levels. By using an hyperbolic function, this circuit provides a more accurate and simple means for obtaining a voltage output which is linearly proportional to the input frequency.

The reset input 302 is coupled to the bases of the three npn transistors 340, 341 and 342 through resistances 343, 344 and 345 respectively. The bases of transistors 340 and 342 are in turn coupled to ground through resistors 346 and 347. The base of transistor 341 is coupled through resistor 348 to a potential source 349. The emitters of transistors 340, 341 and 342 are likewise connected directly to ground potential. The collector of transistor 340 is coupled through resistance 350 to the base of transistor 351 which in turn is coupled through resistor 352 to another source of potential 353. The emitter of pnp transistor 351 is coupled directly to the voltage source 353. The collector of transistor 351 is coupled through resistances 354 and 355 to the collector of transistor 341. The collector of transistor 342 is coupled through resistance 356 to the base of pnp transistor 357, which is in turn coupled through resistance 358 to potential source 353. The emitter of transistor 367 is likewise connected directly to potential source 353. A first capacitor 359 is coupled to the collector of transistor 357 and is connected in series with a second capacitor 360 which is in turn coupled to a ground potential. A line 361 couples the mid-point between resitsors 354 and 355 with the midpoint between capacitors 359 and 360, and is coupled through resistors 362 to the collector of npn transistor 363. The emitter of transistor 363 is connected directly to ground potential. The base of transistor 363 is coupled through resistance 364 to the potential source 349 and again, through resistance 365, the base of transistor 363 is coupled through resistance 366 to the base of transistor 367, the base also being coupled through resistance 368 to ground potential. The emitter of npn transistor 367 is coupled to ground potential and the function generator output line 310.

With the reset input 302 at a logical one, transistors 340, 341 and 342 conduct which in turn causes transistors 351 and 357 to turn on as well. Capacitors 359 and 369 charge through transistor 357 to a voltage approaching the potential 353. The values of the resistors 354 and 355 determine the division of the charge voltage between capacitors 359 and 360. With the input at the reset and ramp input 303 at a logical one, transistors 363 and 367 conduct placing resistors 362 and 369 in a circuit across capacitors 359 and 360.

At the second clock pulse, it will be recalled that the reset pulse returns to logical zero. This causes transistors 340, 341, 342, 351 and 357 to turn off. Capacitors 359 and 360 will then discharge hyperbolically until the third clock pulse occurs which changes the reset and ramp to a logical zero. When the latter occurs, transistors 363 and 367 are turned off holding the charge on capacitors 359 and 360 at a fixed DC voltage the value of which is linearly proportional to the input clock frequency. FIGURE 8b illustrates the output waveform of function generator 304 as it appears at the output 310.

As previously discussed, it is desirable to automatically provide an evaluation of whether test data is within acceptable limits. This function is provided by the comparator 72 which compares test data with the limit data word supplied from the automatic data entry means 20 through the decoder and buffer 22. The detailed circuitry for the comparator 72 is illustrated in FIGURES 10a through 10c. The limit data word is a binary word, there being for substantially all purposes only three significant digits. In a preferred form of the invention the binary word comprises four bits for the respective high and low values of each digit as a total of twenty four bits. As previously stated with respect to FIGURE 2, in automatic engine testing the values of parameters in the hundreds is not ordinarily high and therefore three bits is usually sufficient for the most significant digit. If a conservation of program bits is desired the high and low limits for the most significant digit can be eliminated and only one set of limit values be used, and the third most significant digit can be approximated by using only two bits for each of the high and low limits as will be more fully explained subsequently. A typical limit data word may have, for example, a high decimal value of 189 and a low decimal value of 123 within which test data from the output of the decade counting units 61 shall fall. That is, if the output of the units 61 is 123 or greater, but less than 189, a "good" indication is provided by the evaluatiton readout 82. If the decimal value of the output of the units 61 is less than 123, a "low" indication is provided; whereas, if this value is 189 or greater, a "high" 'indication is provided. If a "good" indication is not provided, a "fail" readout occurs.

The entire limit data word, including the high and low values thereof is compared with the output of the decade counting units 61 by the comparator 72. The comparator 72 includes binary digit comparators 200 through 205. Each of the digit comparators preferably includes logical circuits such as that illustrated in FIGURE 10b. The digit comparators 202 and 205 may include logical circuits like that shown in FIGURE 10c if the 3rd MSD is to be confined to only two bits. If the overall comparator provides only a limit comparison for the second and third most significant digits, then the comparator shown in dotted lines at 206 is coupled as shown. Such a reduced system is mentioned throughout this description since in most instances the most significant digits to be compared will be equal and the inaccuracy caused by comparing only certain values of the third most significant digits do not appreciatively affect the overall accuracy of the system. However, where a great accuracy is desired, limits are provided and compared for the most significant digits as well as limits for all third most significant digits. In the prefered form all digit comparatives 200–205 are as illustrated in FIGURE 10b but in the other embodiment the digit comparators 206, 201 and 204 as illustrated in FIGURE 10b compare the first and second most significant digits coded in binary form "ABCD" for program digit limit data and "EFGH" for a counter digit having the binary and equivalent decimal values as indicated in the table below:

TABLE I

| Program digit | | | | Counter digit | | | | Decimal value |
|---|---|---|---|---|---|---|---|---|
| A | B | C | D | E | F | G | H | |
| 0 | 0 | 0 | 0 | 0 | 0 | 0 | 0 | 0 |
| 1 | 0 | 0 | 0 | 1 | 0 | 0 | 0 | 1 |
| 0 | 1 | 0 | 0 | 0 | 1 | 0 | 0 | 2 |
| 1 | 1 | 0 | 0 | 1 | 1 | 0 | 0 | 3 |
| 0 | 0 | 1 | 0 | 0 | 0 | 1 | 0 | 4 |
| 1 | 0 | 1 | 0 | 1 | 0 | 1 | 0 | 5 |
| 0 | 1 | 1 | 0 | 0 | 1 | 1 | 0 | 6 |
| 1 | 1 | 1 | 0 | 1 | 1 | 1 | 0 | 7 |
| 0 | 0 | 0 | 1 | 0 | 0 | 0 | 1 | 8 |
| 1 | 0 | 0 | 1 | 1 | 0 | 0 | 1 | 9 |

When the two digits (program and counter) are alike, the digit comparator provides an output indicating equality.

For the reduced binary word system, the digit comparators 202 and 205 as illustrated in detail in FIGURE 10c compare two bits of the third most significant program digit of the limit data with the third most significant digit from the decades 61 and provide an equability output when the digits are as indicated in the table below:

TABLE II

| Program digit | | | | Counter digit | | | | Decimal value |
|---|---|---|---|---|---|---|---|---|
| A | B | — | — | E | F | G | H | |
| 0 | 0 | — | — | 0 | 0 | 0 | 0 | 0 |
| 0 | 0 | — | — | 1 | 0 | 0 | 0 | 1 |
| 0 | 0 | — | — | 0 | 1 | 0 | 0 | 2 |
| 1 | 0 | — | — | 1 | 1 | 0 | 0 | 3 |
| 1 | 0 | — | — | 0 | 0 | 1 | 0 | 4 |
| 1 | 0 | — | — | 1 | 0 | 1 | 0 | 5 |
| 0 | 1 | — | — | 0 | 1 | 1 | 0 | 6 |
| 0 | 1 | — | — | 1 | 1 | 1 | 0 | 7 |
| 0 | 1 | 0 | 0 | 0 | 0 | 0 | 1 | 8 |
| 1 | 1 | — | — | 1 | 0 | 0 | 1 | 9 |

Typically, the comparison between the limit data word and the output of the decade counting units 61 is made as a test is being performed, with the output of the units 61 varying with the test results. As will be explained in greater detail subsequently, the entire limit data word is applied to the binary comparators 200 through 205 in the comparator 72 from the decoder and buffer 22, and the output from the units 61 (3 decades are used since 3 digits are being compared) is applied to the binary comparators 200 through 205 at the same time. It should be noted that a greater number of decades may be provided as well as a larger comparator if desired.

The digit comparator shown in FIGURE 10b serves to compare the four program bits ABCD of a limit data word digit wtih the four bits EFGH of the corresponding counter digit. The comparator in FIGURE 10b includes NAND gates 208 through 219 each of which provides a false, or zero, output only when all inputs thereto are true, or ones. Thus, when any input is a zero, the output of the gate is one. The outputs from pairs of gates 208 and 209, 210 and 211, 212 and 213 and 214 and 215 are respectively connected together and connected to the inputs of the gates 216 through 219, respectively, which further include second inputs each supplying ones (1's) thereto. "Not" inputs (Ā, B̄, etc.) are generated in conventional manner by inverting (inverting the A bit for example, to provide Ā) or may be derived from complementary outputs from the decade counting units 61. If the four binary bits representing the limit data digit are equal to the four binary bits from the counter, an output line 220 of the digit comparator provides a true, or one, output. If there is an inequality, the output is false, or zero.

In the reduced binary word system, the binary comparator for the third most significant digit shown in FIGURE 10c serves to compare two bits of a limit data digit with four bits of the counter digit. Only two binary bits of the limit data digit are utilized for simplicity of implementation, and thus, as illustrated in Table II above, the third most significant digit of the limit data words is either zero, three, six or nine. The binary comparator in FIGURE 10c essentially serves to compare the A and B bits of the third most significant digit of the limit data word with the four bits of the third most significant digit from the counter, and includes NAND gates 222 through 230 for performing the comparison. Like the NAND gates 208 through 219 in FIGURE 10b, the NAND gates 222 through 230 each provide a false, or zero, output only when all inputs thereto are true, or ones. The outputs from the gates 222 and 223 are connected to the input of the gate 226, the output of which is connected to the input of the gate 228 along with a "Not A" or Ā input or bit. The outputs of the gates 224 and 225 are applied to the input of the gate 227, and the output of this latter gate is applied to the input of the gate 229 along with the A and E bits. The outputs of the gates 228 and 229 are coupled to the inputs of the gate 230, the output of which is connected to an output line 231. When equality exists as indicated in Table II above between the two bits of the third most significant digit of the limit data word and the third most significant digit from the counter, a true, or one output is supplied on the output line 231 by the gate 230.

In FIGURE 10a, the outputs of the high digit comparators 200, 201 and 202 are connected to inputs of the gate 240, and the outputs of the low digit comparators 203, 204 and 205 are connected to inputs of the gate 241. The output of the gate 240 is connected to a latch 242 including a pair of cross-coupled NAND gates 243 and 244. Thus, the output of the gate 240 is connected to an input of the gate 243, of the latch 242, the output of the gate 243 is connected to an input of the gate 244, and the output of the gate 244 is connected to a second input of the gate 243. The enable line 71 from the counter control 51 is connected to the second input of the gate 244 and provides a zero input to initially condition or set the latch 242.

The output of the gate 241 is connected to the input of a NAND gate 246 of a latch 247 similar to the latch 242. Each of the latches 242 and 247 serve to remember the last signal input thereto. The state of the latch is changed by applying a zero to the side (one of the gates thereof) from which a one is desired, which in turn is an input to the second side (the second gate thereof). The output of the gate 46 is connected to an input of a similar gate 248 which receives a second input from the enable line 71, and which has its output connected to the second input of the gate 246. The initial zero supplied by the enable line 71 also causes the output of the gate 248 to be a one. After the enable line 71 supplies a zero to appropriately set the latches 242 and 247, a one is supplied by this line to the gates 244 and 248 throughout the remainder of the comparison. The output of the gate 243 is applied through a line 250 to a NAND gate 251, and the output of the gate 244 is applied through lines 252 and 253 to NAND gates 254 and 255. The output of the gate 246 is connected through lines 256 and 257 to the inputs of the gates 251 and 255. The output of gate 248 is connected through line 258 to NAND gate 254. An input signal at line 260 is connected to gates 251 and 254 as well as to the input of another NAND gate 262 which has the output of the gate 255 also connected to an input thereof.

A zero output from the gate 251 provides a "high" output signal on an output line 264, a zero output from the gate 254 supplies a "low" signal on an output line 265, a zero from the gate 255 supplies a "good" signal on an output line 266, and a zero from the gate 262 supplies a "fail" signal on an output line 267. A "fail" signal is provided whenever a "good" signal is absent (a one on the output line 266). The lines 264 through 267 are coupled with the evaluation readout 82 to operate respective lamps or other visual indicia for indicating these results of comparison. The "blink" input line 260 may supply pulses (ones) to the inputs of the gates 251, 254 and 262 to cause a flashing indication to be provided when the "high," "low" or "fail" conditions exist.

The comparison performed by the comparator illustrated in FIGURE 10a occurs as the test is being made and as the test data is accumulated in the decade counting units 61. The limit data word is supplied to the comparator from the decoder and buffer 22 with the bits representing the high and low values of the most significant digit being entered into the digit comparators 200 and 203, the bits representing the high and low values of the second most significant digit being entered into the respective comparators 201 and 204, and the bits representing the third most significant digit high and low values being entered into the respective binary comparators 202 and 205. The outputs of the units 61 are coupled to the comparators 200 through 205 in a similar manner along with the limit data word.

Before comparison, the enable line 71 first supplies a zero input to the gates 244 and 248 to initially set the latches 242 and 247 to a desired state. The zero input is followed by a one input which then exists and the inputs thereof include one or more zeros. Thus, the line 71 provides a zero input to the gates 244 and 248, and the gates 240 and 241 provide one input to the respective gates 243 and 246. The outputs of the gates 244 and 248 are one (because each has a zero input from the line 71), and the outputs of the gates 243 and 246 are zeros because both inputs of each are ones (i.e., a one input from a respective gate 240 and 241 and a one input from a respective gate 244 or 248).

As the decade counting units 61 accumulate test data but prior to reaching the low limit indicated by the limit data word (and with a one now applied to the line 71 for the remainder of the comparison) the gates 243, 244, 248 and 246 supply the same initial outputs as indicated above because no equality output (a zero) is yet supplied from the gates 240 and 241. Thus, the one output from the gate 244 and the one output from the gate 248 cause the gate 254 to provide a "low" (a zero) output on the line 265 along with each "blink" pulse (a zero) applied on the line 260. As noted previously, the blink input may be provided to cause an indicator lamp coupled with the line 265 to flash. This "low" flashing signal indicates that the test data from the decade counting units 61 is lower than the low limit of the limit data word. At this time, the gate 251 has zero inputs from the gate 243 and the gate 246 and thus provides a one output which does not indicate a "high" condition. The gate 255 has a one input from the gate 244 and a zero input from the gate 246 and provides a one output which does not represent a "good" condition. The one output from the gate 255 as well as the blinking pulses from the line 260 cause the gate 262 to provide a zero output thereby indicating a "fail" condition.

As the decade counting units 61 accumulate test data and reach the low limit (the lower acceptable limit) indicated by the limit data word, the binary comparators 203, 204 and 205 all provide one output indicating an equality between the output of the decade counting unit and the low limit. This causes the output of the gate 241 to change to a zero providing a zero input to the gate 246. The output from the gate 240 remains a one since the high limit values have not yet been reached and therefore all the inputs to gate 240 are zeroes. The latch 247 changes state, with the output of the gate 246 becoming a one and the output of the gate 248 becoming a zero. The output of the latch 242 remains the same as it was, with a zero output from the gate 243 and a one output from the gate 244. The one output from the gate 244 and the one output from the gate 246 are applied to the gate 255 which in turn provides a zero output on the line 266 thereby indicating a "good" condition. At this time there is no "high," "fail" or "low" indication.

If the test data accumulated by the decades 61 continues to get larger in value but below the high limit, the binary comparators 200 through 205 do not all provide equality outputs (ones) and the gates 240 and 241 both provide one outputs. This is the same output which previously existed from the gate 240 and hence the latch 242 still does not change state. The output from the gate 241 goes from a zero to a one, but the state of the latch 247 does not change inasmuch as the gate 248 still supplies a zero input to the gate 246 and this latter gate does not change state. Thus, the "good" indication continues.

If the accumulated test data reaches the value of the high limit (the first upper unacceptable limit), the binary comparators 200 through 202 provide one outputs, thereby causing the output of the gate 240 to become zero. The output of the gate 241 remains as it was, and so does the output of the latch 247. The zero output from the gate 240 applied to the input of the gate 243 causes the gate to now provide a one output and the gate 244 to provide a zero output. The gate 251 has a one input from the gate 243 and a one input from the gate 246 and provides a zero output on the line 264 indicating a "high" condition. The gate 255 receives a zero output from the gate 244 and a one output from the gate 246 and thus provides a one output which in turn causes the gate 262 to provide a "fail" indication.

It will be appreciated that the decade counting units 61 may reach a steady output indicating the test data, and that this output may be low-fail, good or high-fail and appropriately indicated by the readout 82. Thus, it should be apparent that the comparator 72 illustrated in FIGURE 10a provides a comparison between the accumulated test data and the limit data word to provide a low indication if the accumulated data is below the lower limit, a high indication if the accumulated data is equal to or greater than the high limit, and a good indication in-between. Whenever a good indication is not provided, a fail indication is provided. The readout of test data may be held (stored) by the decade counting units 61 or a register in the readout control 63 until the start of the next test, or control 63 may hold this data until the end of the next test, if desired.

Figure 11:
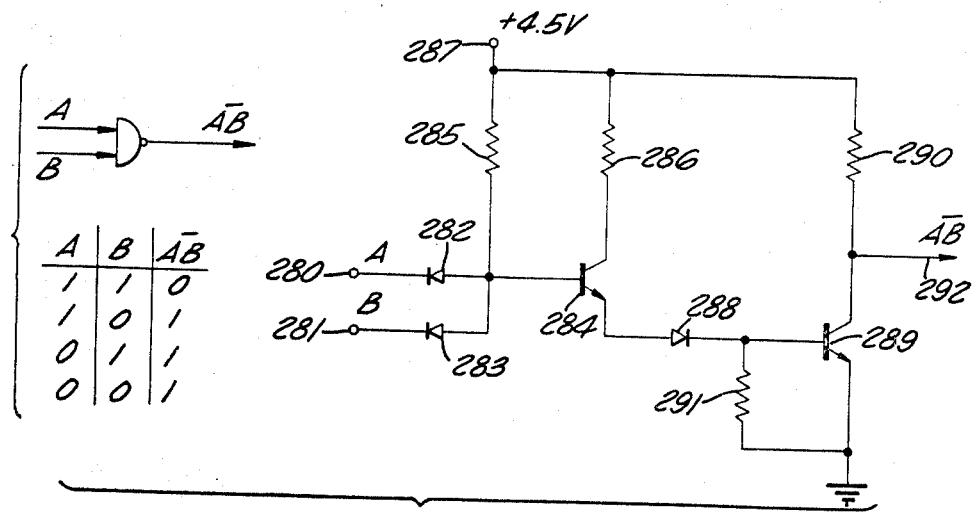
FIGURE 11 is a circuit diagram of another typical logic component.

FIGURE 11 illustrates a typical NAND gate, along with the block symbol and truth-table therefore of the type which may be used for the NAND gates previously discussed. The gate includes input terminals 280 and 281 connected through respective diodes 282 and 283 to the base of the npn transistor 284. The base and collector of the transistor 284 are connected through respective resistances 285 and 286 to a positive voltage terminal 287, for example, 4.5 volts. The emitter of the transistor 284 is connected through a diode 288 to the base of an npn transistor 289 which has its emitter grounded, and its collector connected through a resistance 290 to the terminal 287. A resistance 291 is connected between the base and emitter of the transistor 289. An output line 292 is connected to the collector of the transistor 289. The NAND gate in FIGURE 11 provides a zero (substantially ground) output only when both inputs thereto are ones (approximately 4.5 volts positive). If either input is a zero, the output is a one. If no input is connected to one of the terminals 280 and 281, it is equivalent to providing a one input.

As a further example of tests which may be performed by the utilization of the concepts of the present invention, reference is herein made to co-pending U.S. patent application, Ser. No. 483,187 filed Aug. 27, 1965 by Hermann W. Stocker, now U.S. Patent 3,424,979 and assigned to the assignee of the present invention, the disclosure of which is incorporated herein by reference. This application relates to an adapter for use in the testing of a vehicle electrical system and includes means for switching, simulating, loading and controlling the performance of an engine. Relay means may be utilized to operate the control switches thereof through the control and conditioning circuit 33 of the present application, and the electrical signals generated thereby may be applied to the input cable 45 of the system shown in FIGURE 1 of the present application. Example of tests which may be performed include a determination of battery voltage with and without load, point resistance, resistance in the primary coil, condition of the starter motor and the starter solenoid, current and voltage output of the regulator during charging, operation of the regulator cut-out relay, and output of the generator or alternator. The signals (voltages and currents) generated may be digitized through the use of the voltage controlled oscillator of the present invention, and counted to provide a readout indication of the signals measured. Furthermore, such signals may be compared with limit data words in the manner previously described.

Furthermore, it will be appreciated that various other signals and functions may be tested and/or evaluated in accordance with the teachings of the present invention. For example, signals from a dynamometer coupled with an automobile may be tested and evaluated. Additionally, ultrasonic measuring techniques may be utilized wherein ultrasonic signals are applied to the engine block, bearings, etc., and various ultrasonic transducers coupled therewith to pick up the resulting signals, with the delays therein or frequencies thereof being measured and evaluated.

It will be understood that although exemplary embodiments of the present invention have been disclosed and discussed, other procedures, circuitry, component arrangements, and applications are possible and that the embodiments disclosed may be subjected to various changes, modifications, and substitutions without necessarily departing from the spirit of the invention. In particular, although the present invention has been disclosed with reference to internal combustion engine and automotive analysis, it may be used for other monitoring, testing and/or control purposes.

We claim:

1. A performance analyzer for analyzing the performance of a unit having a plurality of transducers coupled therewith for providing electrical signals representative of unit performance parameters, comprising
program means for generating operational information and for receiving input data and generating limit data,
input means adapted to be coupled to said unit for receiving said signals from said transducers, said program means being connected to said input means for passing operational information thereto for causing said input means to select respective ones of said signals,
conditioning means coupled with said input means for conditioning at least one of said signals,
accumulating means coupled with said input means for receiving a selected signal and providing an output signal as a function thereof, and
comparing means coupled with said program means and said accumulating means for comparing said output signal thereof with said limit data.

2. A system for analyzing the performance of a unit, comprising
program means for providing program information;
input means for receiving signals from said unit, said signals being representative of parameters thereof, said program means being connected to said input means for selecting said signals;
conditioning means coupled with said input means for receiving and conditioning at least some of said signals;
accumulating means coupled with said conditioning means for receiving conditioned signals and providing output signals functionally related thereto; and
comparison means coupled with said program means and said accumulating means for comparing said output signals thereof with program information to provide output indicia representative of the condition of said parameters.

3. A system for analyzing the performance of an automobile engine, comprising
program means for providing program information;
circuit means for receiving signals from said engine, said signals being representative of parameters thereof, said program means being connected to said circuit means for enabling the selection of said signals, said circuit means including a first converter means for receiving a pulse having a time duration substantially equal to the time between two events representing a parameter and providing a first output voltage proportional to the time duration of said pulse, said circuit means including a second converter means coupled to receive said first output voltage and provide a second output signal having a frequency proportional thereto;
accumulating means coupled with said circuit means for receiving said second output signal, a source of fixed frequency signals, said means accumulating said fixed frequency signals for a time which is a function of the frequency of said second output; and
comparison means coupled with said program means and said accumulating means for comparing the output of said accumulating means with said program information to provide an output representing the condition of parameters of said automobile engine.

4. A system for analyzing the performance of an automobile engine, comprising
program means for providing program information;
circuit means for receiving signals from said engine, said signals being representative of performance parameters thereof, said program being connected to said circuit means for enabling the selection of said signals, said circuit means including a first converter means for receiving an input pulse having a frequency representing a performance parameter, said first converter means providing a first output voltage proportional to the frequency of the input pulse, said circuit means including a second converter means coupled to receive said first output voltage and provide a second output signal having a frequency proportional thereto;
counting means coupled to said circuit means for receiving said second output signal, said counting means counting the frequency of said second output signal and providing an output; and
comparison means coupled with said program means and said counting means for comparing the output of said counting means with program information to provide an output representing a condition of parameters of said automobile engine.

5. A system of the type described in claim 4 wherein said first converter means comprises function control means, time delay means coupled to said function control means and to said counting means, said function control means connected to function generating means for generating a first output signal the voltage of which is proportional to the frequency of the input signal; said second converter means comprising a voltage controlled oscillator, said time delay being coupled to gate said counting means.

6. A system of the type described in claim 5 wherein said function control means comprises
first, second and third flip-flops, a NAND gate, an inverter and a time delay means;
said first flip-flop having its input adapted to receive clock pulses from said engine, one of the outputs of said first flip-flop being connected to the input of said second flip-flop, the other output of said first flip-flop being connected to one input of said NAND gate;
said second flip-flop having one of its outputs connected to the other input of said NAND gate, said output of said second flip-flop being also connected to the input of said third flip-flop, said output of said second flip-flop further providing an output to said function generating means;

said NAND gate output being connected to said inverter, the output of said inverter providing an output to said function generating means;

said third flip-flop having one of its outputs connected to said time delay means to provide a start signal thereto, said output also being coupled to said counting means to gate the same, the other output of said third flip-flop being connected to a reset input terminal of said second flip-flop, a reset input terminal of said third flip-flop being connected to said time delay means to receive a stop signal therefrom at the end of the time period.

7. A system of the type described in claim 5 wherein said function generating means comprises two capacitors coupled in series, circuit means for charging said capacitors in response to a first signal from said function control means, means stopping the charging of said capacitors upon the cessation of said first signal whereby said capacitors discharge hyperbolicly, means stopping the discharge of said capacitors in response to a second signal from said function control means whereby the charge on said capacitors is held at a fixed voltage level, the output of said function generating means being coupled to said capacitors and thereby providing a voltage linearly proportional to the frequency of the input clock pulses.

8. A system for analyzing a performance of an automobile engine comprising
- program means for providing program information and limit data;
- control means coupled with said program means and responsive to said program information;
- input means for receiving signals from said engine, said program means being connected to said input means for enabling the selection of said signals;
- means coupling said control means with said engine to affect the operation thereof;
- accumulating means coupled with said circuit means for receiving selected signals and providing output signals functionally related thereto, and
- comparison means coupled with said program means and said accumulating means for comparing the output signals thereof with said limit data to provide output indicia representative of the performance of said engine.

9. A system for analyzing the performance of a unit under test having means coupled thereto providing electrical signals representing operational parameters thereof comprising
- data entry means for receiving program information, said information including data representing acceptable parameter ranges, data providing limit signals, and data generating control signals;
- decoding means coupled with said data entry means for providing limit data and control data outputs;
- input control means coupled with said decoder means for receiving said control data;
- input switching means coupled to receive said electrical signals from said unit under test, and further coupled to said control means to be operated thereby for selecting one or more of said signals and routing them to the output of said switching means;
- accumulating means for accumulating input signals thereto and providing sum output signals;
- first circuit means coupled between the output of said switching means and an input of said accumulating means for supplying input signals thereto, second circuit means coupled to said decoding means and to an input of said accumulating means for providing frequency signals thereto;
- readout means coupled with said accumulating means for providing indicia representing said sum signals; and
- comparator means coupled with the output of said decoding means and said accumulating means for comparing said limit data signals and said sum signals and providing an output representing the result of said comparison.

10. A performance analyzer for analyzing the performance of a unit having means coupled therewith for providing electrical signals representative of operational parameters thereof, comprising
- program means for generating control information and for generating coded limit data, said coded limit data including digital information providing upper and lower limits within which an acceptable operational parameter falls;
- input means for receiving said electrical signals from said unit, said program means being coupled to said input means for applying control information thereto for causing said input means to select respective signals;
- accumulating means coupled with said input means for receiving a selected signal and providing an output signal as a function thereof; and
- comparing means coupled with said program means and said accumulating means for comparing the output of said accumulating means with said digital information, said comparing means including a plurality of interconnected logical circuits for comparing respective individual items of said output signal of said accumulating means and said digital information and providing output equality and nonequality signals, and having logical circuit means receiving said equality and non-equality signals for providing signals indicative of whether the output of said accumulating means is within or outside the limits of said digital information.

11. A performance analyzer for analyzing the performance of a unit having means coupled therewith for providing electrical signals representative of operational parameters thereof, comprising
- data entry means for receiving a program code, said code comprising digital information including control data, function data and limit data representing acceptable parameter limits;
- first decoding means coupled to said data entry means, input control means coupled between said first decoding means and said unit under analysis, said first decoding means operative to provide control information to said control means, said control means operative to affect the performance of said unit;
- second decoding means coupled to said data entry means, input switching means coupled with said second decoding means and the unit under analysis, said second decoding means providing control information to said switching means for selecting appropriate signals from said unit;
- accumulating means providing sum output signals, circuit means coupled to said accumulating means for feeding frequency signals thereto, third decoding means coupled with said data entry means, said third decoding means further coupled with the unit under test and said circuit means, said third decoding means receiving function data from said program code to determine operation of said accumulating means;
- readout means coupled to said accumulating means for providing indicia representing said sum signals;
- fourth decoding means coupled to said data entry means receiving limit data information from said program code, said fourth decoding means coupled to a comparator means, said comparator coupled to said accumulating means for comparing said sum signals and said limit data and providing an output representing the result of said comparison; and readout means coupled to the output of said comparator means for providing indicia representing the result of said comparison.

References Cited

UNITED STATES PATENTS

| | | | |
|---|---|---|---|
| 3,099,154 | 7/1963 | Vanderbilt | 73—117.3 |
| 3,304,768 | 2/1967 | Naumann et al. | 73—93 X |
| 3,333,463 | 8/1967 | Hollinghurst | 73—117 |
| 3,350,928 | 11/1967 | Fedde | 73—116 |
| 3,374,665 | 3/1968 | Preston | 73—90 |

OTHER REFERENCES

Dipaolo, S. J.: Unique Computer System Monitors Aircraft Engines, from Electronics, vol. 36, No. 2, Jan. 11, 1963, pp. 38–41.

RICHARD C. QUEISSER, Primary Examiner

JERRY W. MYRACLE, Assistant Examiner

U.S. Cl. X.R.

235—150.2